United States Patent
Roessl et al.

(10) Patent No.: US 9,423,515 B2
(45) Date of Patent: Aug. 23, 2016

(54) PHOTON COUNTING DETECTOR

(75) Inventors: Ewald Roessl, Ellerau (DE); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 150 days.

(21) Appl. No.: 14/237,916

(22) PCT Filed: Aug. 16, 2012

(86) PCT No.: PCT/IB2012/054170
§ 371 (c)(1),
(2), (4) Date: Feb. 10, 2014

(87) PCT Pub. No.: WO2013/030708
PCT Pub. Date: Mar. 7, 2013

(65) Prior Publication Data
US 2014/0183371 A1    Jul. 3, 2014

Related U.S. Application Data

(60) Provisional application No. 61/528,785, filed on Aug. 30, 2011.

(51) Int. Cl.
*G01T 1/24* (2006.01)

(52) U.S. Cl.
CPC . *G01T 1/24* (2013.01); *G01T 1/241* (2013.01); *G01T 1/247* (2013.01)

(58) Field of Classification Search
CPC .................................. G01T 1/24; G01T 1/247
See application file for complete search history.

(56) References Cited

U.S. PATENT DOCUMENTS

| | | | | |
|---|---|---|---|---|
| 6,043,495 A | * | 3/2000 | Verger | H01L 31/115 250/370.01 |
| 6,069,360 A | * | 5/2000 | Lund | H01L 31/115 250/370.01 |
| 6,175,120 B1 | * | 1/2001 | McGregor | G01T 1/24 250/370.06 |
| 6,995,444 B2 | | 2/2006 | Cova et al. | |
| 7,330,527 B2 | | 2/2008 | Hoffman et al. | |
| 2003/0063707 A1 | | 4/2003 | Mulhollan | |
| 2005/0184320 A1 | * | 8/2005 | Green | H01L 27/14676 257/290 |
| 2007/0290142 A1 | | 12/2007 | Du et al. | |
| 2009/0184251 A1 | * | 7/2009 | Karim | G01T 1/241 250/370.01 |
| 2009/0194703 A1 | * | 8/2009 | Eversmann | G01T 1/17 250/395 |
| 2010/0270473 A1 | | 10/2010 | Kraft et al. | |
| 2011/0155918 A1 | | 6/2011 | Bouhnik et al. | |
| 2012/0236986 A1 | * | 9/2012 | Schroter | G01T 1/247 378/19 |

FOREIGN PATENT DOCUMENTS

| EP | 1351309 A2 | 10/2003 |
|---|---|---|
| WO | 2011013031 A1 | 2/2011 |

* cited by examiner

*Primary Examiner* — Christine Sung

(57) ABSTRACT

A detector array includes at least one direct conversion detector pixel (114-114M) configured to detect photons of polychromatic ionizing radiation. The pixel includes a cathode layer (116), an anode layer (118) including an anode electrode (118-118 M ) for each of the at least one detector pixels, a direct conversion material (120), disposed between the cathode layer and the anode layer, and a gate electrode disposed in the direct conversion material, parallel to and between the cathode and anode layers.

27 Claims, 6 Drawing Sheets

PHOTON COUNTING DETECTOR

CROSS REFERENCE TO RELATED APPLICATIONS

Figure 1:
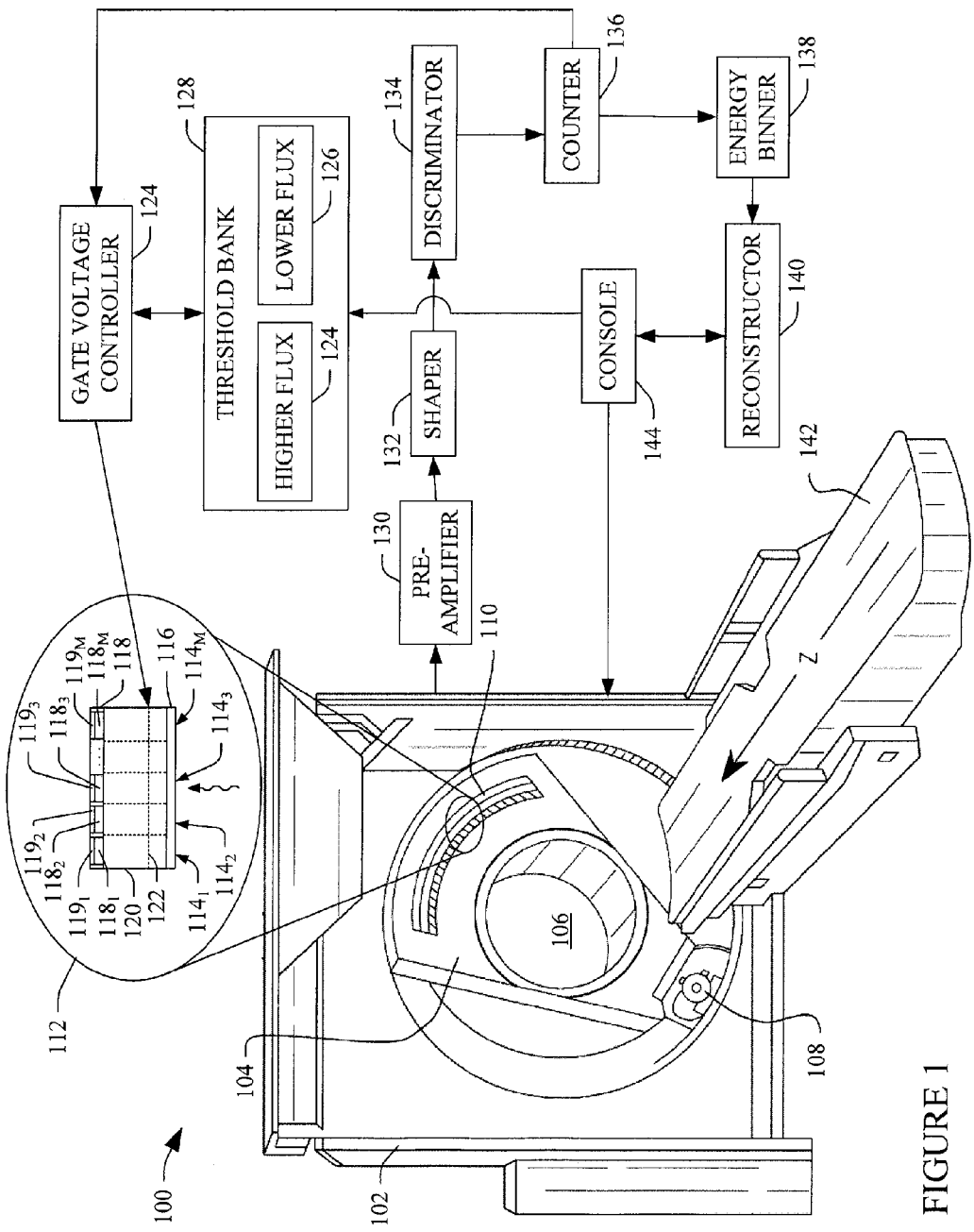

This application is a national filing of PCT application Ser. No. PCT/IB2012/054170, filed Aug. 16, 2012, published as WO 2013/030708A2 on Mar. 7, 2013, which claims the benefit of U.S. provisional application Ser. No. 61/528,785 filed Aug. 30, 2011, which is incorporated herein by reference.

The following generally relates to a direct conversion photon counting detector and is described with particular application to computed tomography (CT); however, the following is also amenable to other imaging modalities.

A computed tomography (CT) scanner includes a rotating gantry rotatably mounted to a stationary gantry. The rotating gantry supports an X-ray tube. A detector array is located opposite the X-ray tube, across an examination region. The rotating gantry and the X-ray tube rotate around the examination region about a longitudinal or z-axis. The X-ray tube is configured to emit poly-energetic ionizing radiation that traverses the examination region and illuminates the detector array. The detector array includes a one or two dimensional array of detector pixels that detect the radiation and that generate signals indicative thereof. Each pixel is associated with a readout channel, which is used to convey a corresponding signal for further processing. A reconstructor reconstructs the processed signals, producing volumetric image data indicative of the examination region.

For spectral CT, the detector pixels have included direct conversion detector pixels. Generally, a direct conversion pixel includes a direct conversion material disposed between a cathode and an anode, and a voltage is applied across the cathode and the anode. Photons illuminate the cathode, transferring energy to electrons in the direct conversion material, which creates electron/hole pairs, with the electrons drifting towards the anode. The anode, in response, produces an electrical signal. A pulse shaper processes the electrical signal and produces a pulse having peak amplitude indicative of the energy of the detected photon. A pulse discriminator compares the amplitude of the pulse with energy thresholds. For each threshold, a counter counts the number of pulses that cross the threshold. An energy-binner bins the counts in energy-ranges, thereby energy-resolving the photons. The reconstructor reconstructs the binned signals using a spectral reconstruction algorithm.

A direct conversion pixel, generally, can handle photon flux rates up to ten million counts per second (10 Mcps) per channel as the measurement of the energy of an individual photon has taken on the order of ten nanoseconds (or ten MHz), which provides enough time to collect charge so that the pulse height remains indicative of the photon's energy. Photon flux rates greater than 10 Mcps per channel may result in overlapping pulses (i.e., pulse pile-up) as a next photon may arrive before the measurement of a current photon is complete. When pulses overlap, their amplitudes combine so that the individual pulses may not be discernable from the combination, and the peak energy of a pulse is shifted by the amplitude contribution of overlapping pulse such that the energy distribution of the detected photons may be erroneous, reducing image quality. In CT, the photon flux rate can be on the order of several hundreds of Mcps per channel and, thus, state of the art direct conversion pixels are not well-suited for diagnostic CT applications.

Figure 4:
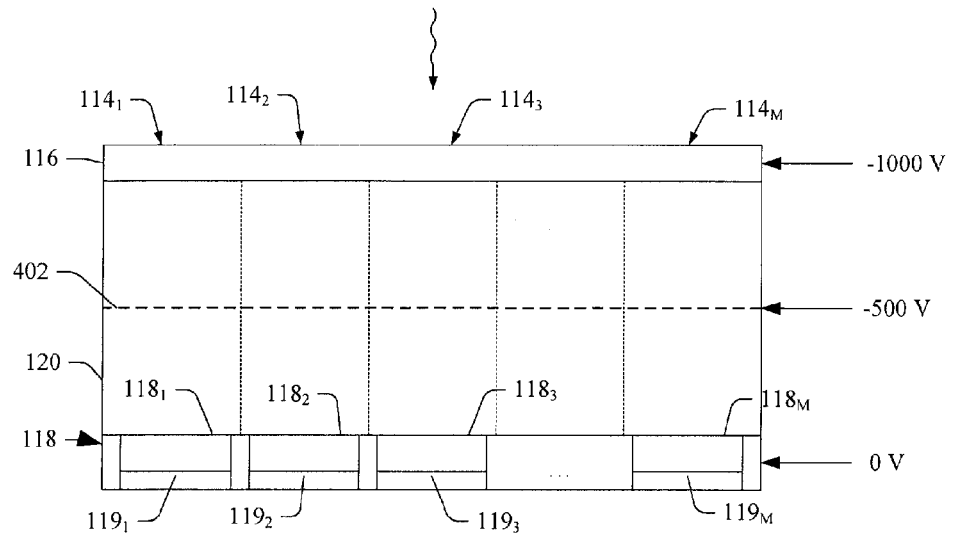

One proposed approach for mitigating pulse pile-up for higher photon flux rates is described in US2007/0290142A1. This publication describes a direct conversion detector pixel with one or more bias electrodes fabricated in the plane in which the anode electrode resides. Each of the one or more electrodes is located at a different distance away from the anode electrode and surrounds the anode electrode in that plane, and is used to control the sensitive detector volume of the pixel and thus the effective photon count rate as photons illuminating the non-sensitive detector volume are ignored. FIG. 4 of the publication is reproduced in FIG. 7 herein and shows the anode side of a detector pixel 68, including an anode electrode 70 and bias electrodes 72, 74 and 76, which form concentric circles in the plane of the anode electrode around the anode electrode 70. Bias logic 86 controls the voltages 92, 94 and 96 applied to each of the three bias electrodes 72, 74 and 76 based on flux rate signal 102 determined by a flux rate counter 100.

As disclosed in US2007/0290142A1, at flux rates from 0 to 30 Mcps, the logic 86 sets the voltages of the bias electrodes 72, 74, 76 so that the voltages are maintained at a lower voltage relative to the voltage of the anode electrode 70. In this case, the sensitive detector volume is the entire area within electrode 72. At flux rates from 30 to 100 Mcps, the logic 86 sets the voltage of the bias electrode 72 to the voltage of the anode electrode 70, and the sensitive detector volume is reduced to the volume within electrode 74. At flux rates from 100 to 300 Mcps, the logic 86 sets the voltage of the bias electrode 74 to the voltage of the anode electrode 70, and the sensitive detector volume is reduced to the volume within electrode 76. At flux rates from 300 to 1000 Mcps, the logic 86 sets the voltage of the bias electrode 76 to the voltage of the anode electrode 70, and the sensitive detector volume is reduced to the volume of the anode electrode 70. Generally, with each reduction in sensitive detector volume from 72, to 74, to 76 to 70, there is a corresponding linear reduction in the number of counts per second per channel as the photons illuminating non-sensitive detector volume are not counted.

By way of example, with the approach disclosed in US2007/0290142A1, decreasing the sensitive detector volume by 10% generally results in a 10% decrease in the number of photons per second per channel. Thus, to reduce a higher flux rate from 100 Mcps per channel to 10 Mcps per channel (or to ¹/₁₀ of the flux rate), the sensitive detector volume would have to be reduced by 90%. For this, the corresponding bias electrode would have to be close to the anode electrode 70. Unfortunately, fabricating a bias electrode in a detector pixel close to the anode electrode 70 can be difficult. Furthermore, the spectral performance and pulse shape would change. Moreover, photons scattered in the non-sensitive detector volume near the sensitive detector volume may enter the sensitive detector volume, distorting the measured signal. In view of the foregoing, there is an unresolved need for other approaches for mitigating pulse pileup for higher photon flux rates.

Aspects described herein addresses the above-referenced problems and others.

In one aspect, a detector array includes at least one direct conversion detector pixel configured to detect photons of poly-chromatic ionizing radiation. The pixel includes a cathode layer, an anode layer including an anode electrode for each of the at least one detector pixels, a direct conversion material, disposed between the cathode layer and the anode layer, and a gate electrode disposed in the direct conversion material, parallel to and between the cathode and anode layers.

In another aspect, a method of detecting, for high photon flux rates, photons with a direct conversion detector having at least one detector pixel with a direct conversion material including a gate electrode and disposed between a cathode and an anode of the pixel, includes applying a first voltage to the gate electrode, wherein the first voltage is not equal to a voltage applied to the cathode, and the first voltage causes approximately the entire direct conversion material to be used to convert photons incident on the detector pixel to corresponding signals indicative of an energy of the photons. The method further includes counting a number of photons detected in a predetermined time interval based on the signals. The method further includes determining a count rate based on the number of counted photons and the predetermined time interval. The method further includes comparing the determined count rate with a higher photon flux rate threshold. The method further includes removing the first voltage and applying a second voltage to the gate electrode in response to the determined count rate satisfying the higher photon flux rate threshold, wherein the second voltage is approximately equal to the voltage applied to the cathode, and the second voltage causes less than the entire direct conversion material to be used to convert photons incident on the detector pixel to corresponding signals indicative of an energy of the photons.

In another aspect, a method of detecting, for higher photon flux rates, photons with a direct conversion detector having at least one detector pixel with a direct conversion material including a gate electrode and disposed between a cathode and an anode of the pixel, includes applying a first voltage to the cathode, wherein the first voltage is not equal to a voltage applied to the gate electrode, and the first voltage causes approximately the entire direct conversion material to be used to convert photons incident on the detector pixel to corresponding signals indicative of an energy of the photons. The method further includes counting a number of photons detected in a predetermined time interval based on the signals. The method further includes determining a count rate based on the number of counted photons and the predetermined time interval. The method further includes comparing the determined count rate with a higher photon flux rate threshold. The method further includes removing the first voltage and applying a second voltage to the cathode in response to the determined count rate satisfying the higher photon flux rate threshold, wherein the second voltage is approximately equal to the voltage applied to the gate electrode, and the second voltage causes less than the entire direct conversion material to be used to convert photons incident on the detector pixel to corresponding signals indicative of an energy of the photons.

In another aspect, an imaging system includes a radiation source configured to emit ionizing radiation and a detector array including at least one direct conversion detector pixel configured to detect the ionizing radiation. The pixel includes a cathode layer, an anode layer including an anode electrode for each of the detector pixels, and a direct conversion material, disposed between the cathode layer and the anode electrode, which converts photons of the ionizing radiation that are absorbed in the direct conversion material into electrical signals indicative of an energy of the absorbed photons. A gate electrode is disposed in the direct conversion material, parallel to the cathode layer and the anode layer, between the cathode layer and the layer electrode.

The invention may take form in various components and arrangements of components, and in various steps and arrangements of steps. The drawings are only for purposes of illustrating the preferred embodiments and are not to be construed as limiting the invention.

FIG. 1 schematically illustrates an example imaging system that includes a detector array having a one or two dimensional array of direct conversion detector pixels, wherein at least one of the pixels includes a gate electrode in the direct conversion material disposed between the cathode and anode that controls the photon count rate of the pixel.

Figure 2:
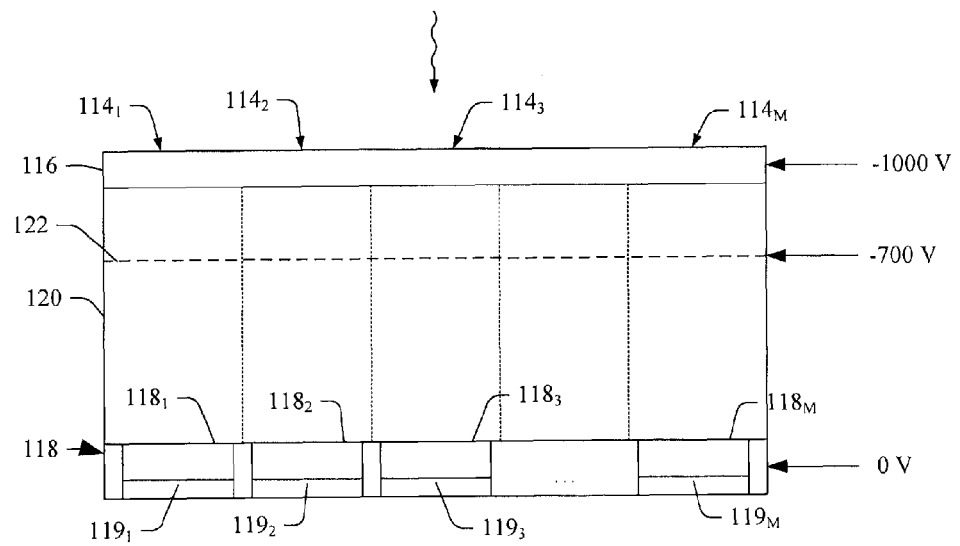

FIG. 2 schematically illustrates a portion of the detector array for lower photon flux rates in which the gate electrode voltage is not used to reduce the sensitive detector volume of any of the direct conversion detector pixels.

Figure 3:
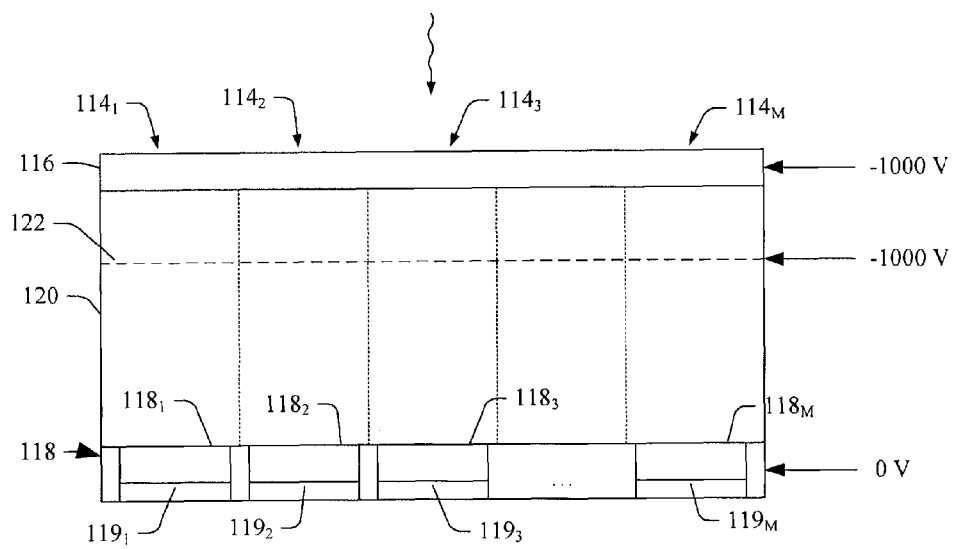

FIG. 3 schematically illustrates a portion of the detector array for higher photon flux rates in which the gate electrode voltage is used to reduce the sensitive detector volume of at least one of the direct conversion detector pixels to control the photon count rate of the pixel.

FIG. 4 schematically illustrates a variation of the portion of the detector array in which the gate electrode is located at a different position between the cathode and anode, relative to the configuration shown in FIGS. 1-3

Figure 5:
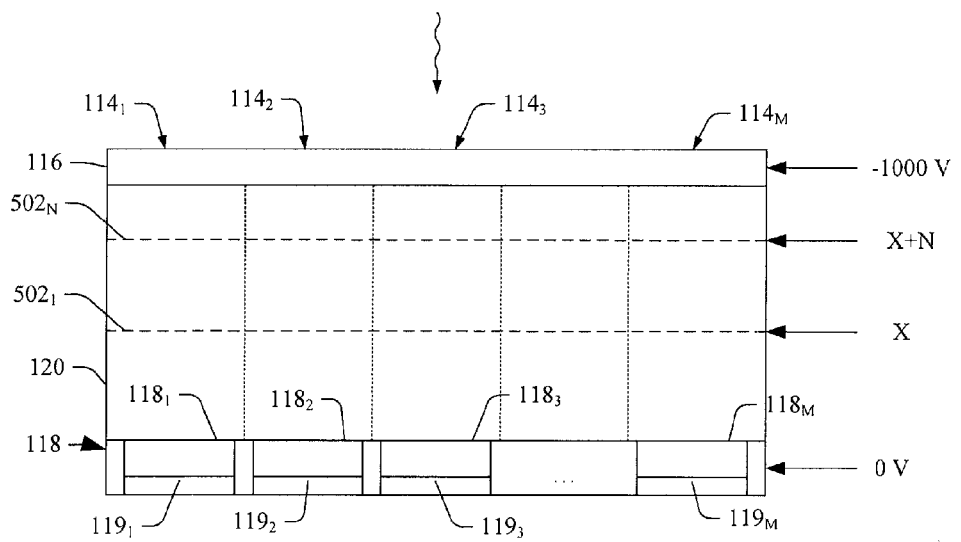

FIG. 5 schematically illustrates a variation of the portion of the detector array that includes a plurality of gate electrodes.

Figure 6:
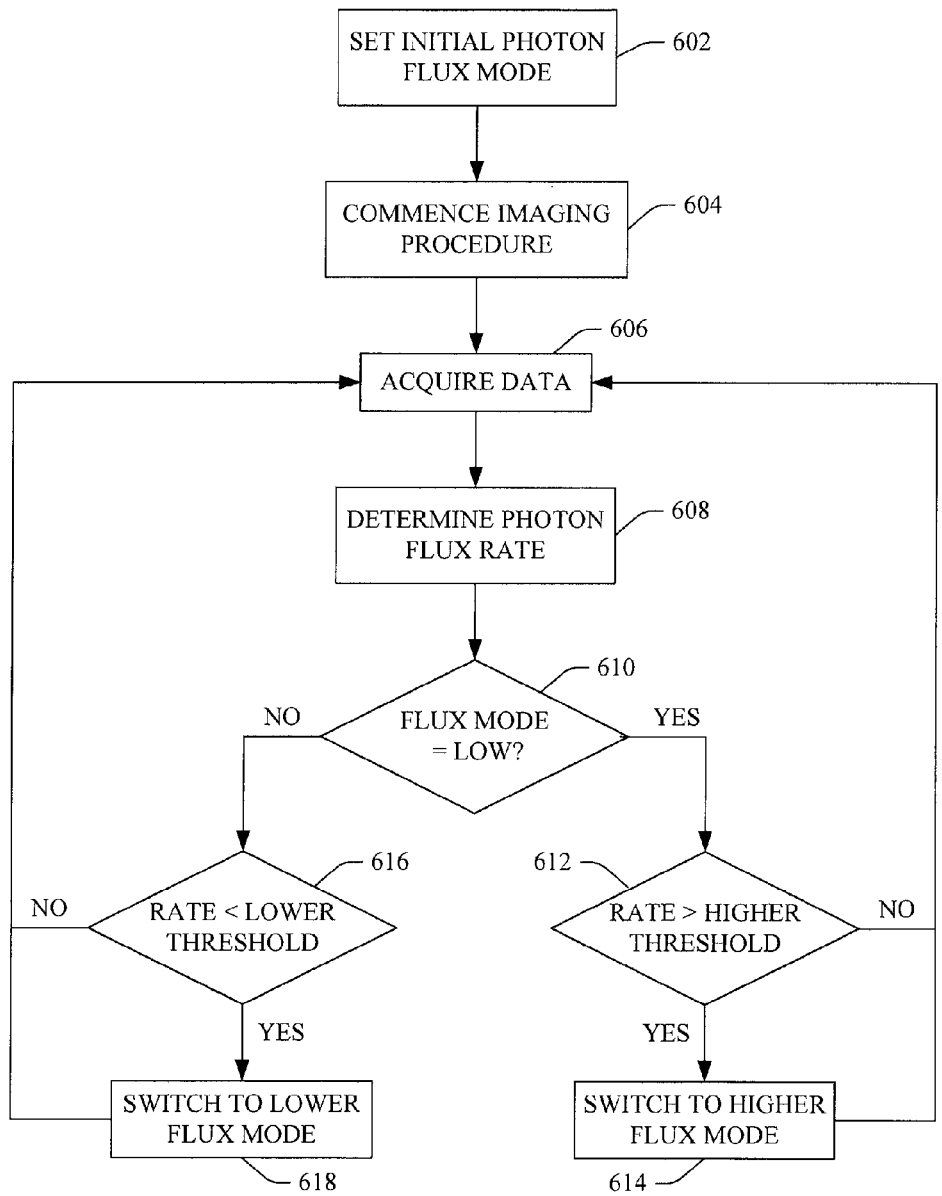

FIG. 6 illustrates a method in accordance with the detector array described herein.

Figure 7:
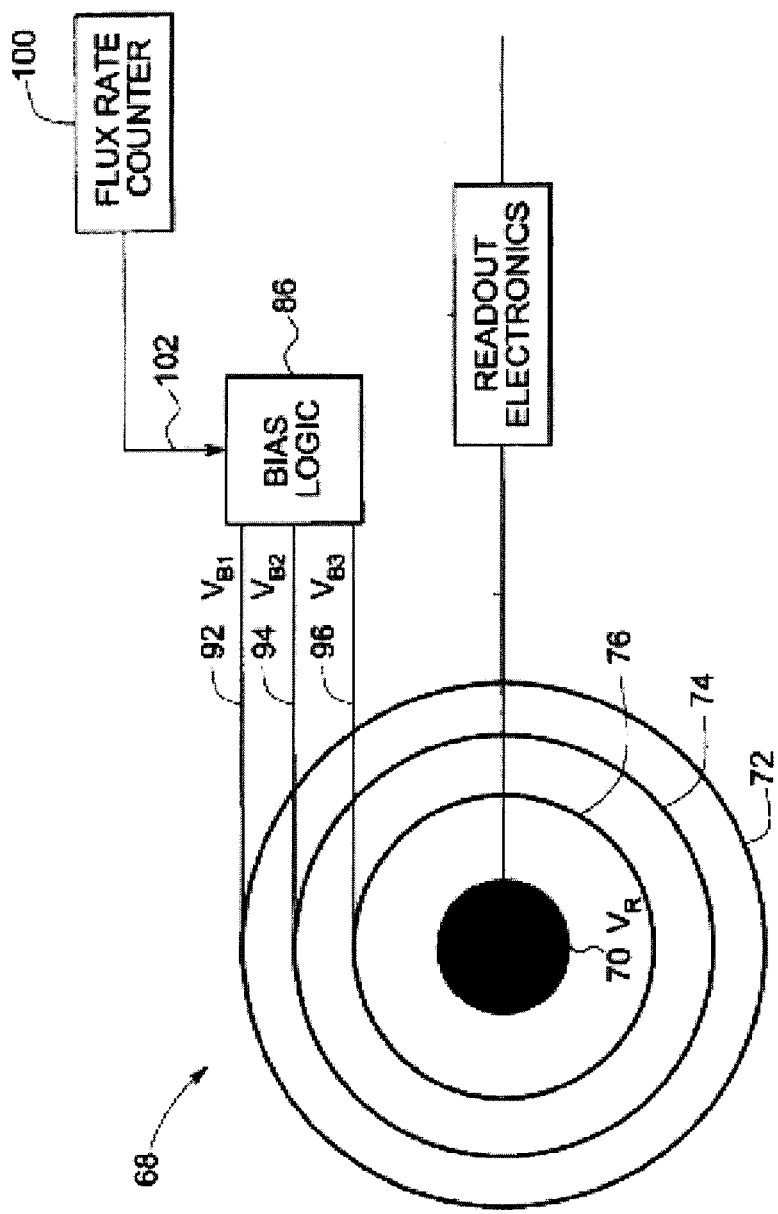

FIG. 7 schematically illustrates a prior art direct conversion detector pixel.

Figure 8:
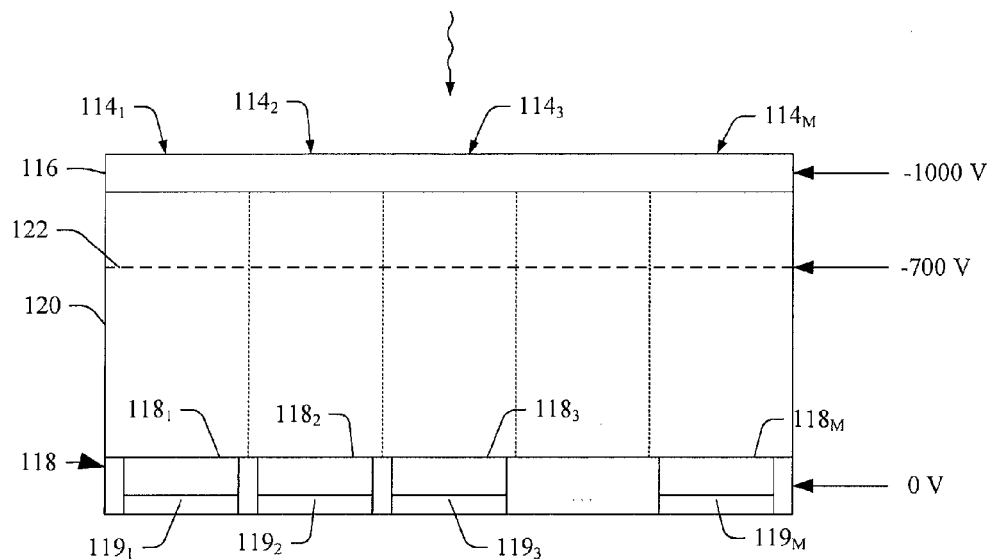

FIG. 8 schematically illustrates a portion of the detector array for lower photon flux rates in which the cathode layer voltage is not used to reduce the sensitive detector volume of any of the direct conversion detector pixels.

Figure 9:
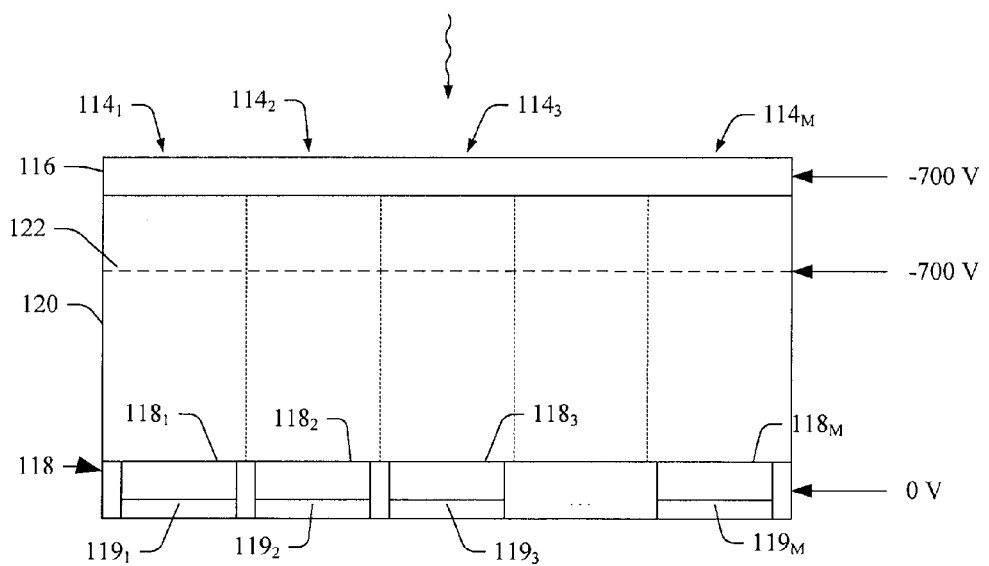

FIG. 9 schematically illustrates a portion of the detector array for higher photon flux rates in which the cathode layer voltage is used to reduce the sensitive detector volume of at least one of the direct conversion detector pixels to control the photon count rate of the pixel.

FIG. 1 schematically illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis. The imaging system 100 further includes a radiation source 108, such as an X-ray tube, which is supported by and rotates with the rotating gantry 104 around the examination region 106 about the longitudinal or z-axis. The radiation source 108 emits polyenergetic ionizing radiation that is collimated by a collimator to produce a generally fan, wedge, or cone shaped radiation beam that traverses the examination region 106.

The imaging system 100 further includes a detector array 110 that subtends an angular arc opposite the examination region 108 relative to the radiation source 106. The illustrated detector array 110 includes a plurality of one or two dimensional detector modules 112 arranged along a transverse or x-direction. In this example, a module 112 includes direct conversion detector pixels $114_1$, $114_2$, $114_3$, ... $114_M$ (wherein M is an integer equal or greater than one), with a cathode layer 116 that is shared across the pixels $114_1$-$114_M$, a anode layer 118 with corresponding individual pixel anode electrodes $118_1$, $118_2$, $118_3$, ... $118_M$, and a direct-conversion material 120, such as cadmium telluride (CdTe), cadmium zinc telluride (CZT), etc., disposed therebetween. Each of the pixels $114_1$, $114_2$, $114_3$, ... $114_M$ also has a corresponding readout channel $119_1$, $119_2$, $119_3$, ... $119_M$.

In this example, a gate electrode 122 extends across the pixels $114_1$-$114_M$ of the module 112, parallel to the cathode layer 116, and between the cathode layer 116 and the anode layer 118. As such, the gate electrode 122 is located below or above (depending on relative orientation), but not in the plane in which the anode electrodes $118_1$-$118_M$, are in. A pixel voltage controller 124 is in electrical communication with the gate electrode 122 and controls the voltage applied to the gate electrode 122. As described in greater detail below, the gate voltage determines whether the pixels $114_1$-$114_M$ of the detector module 112 are in a lower photon flux rate mode in which substantially all of the direct conversion material 120 of each of the pixels $114_1$-$114_M$ is sensitive to photons and a higher photon flux rate mode in which only a selected sub-region of the direct conversion material 120 of each of the pixels $114_1$-$114_M$ is sensitive and the remaining region is insensitive to photons, wherein the location and the voltage of the gate electrode 122 in the direct conversion material 120 determines the sensitive and non-sensitive detector volumes.

In the illustrated embodiment, the pixel voltage controller 124 controls the voltage of the gate electrode 122 based on whether the photon count rate over a predetermined time period pass a higher flux rate threshold 125 or a lower flux rate threshold 126, both of which are stored in a threshold bank 128 in this example and can be default, user defined, etc. For the higher photon flux rate mode, the gate electrode voltage is set so that the region between the cathode layer 116 and the gate electrode 122 is not sensitive to photons and the region between the gate electrode 122 and the anode layer 118 is sensitive to photons. As such, only the photons absorbed in between the gate electrode 122 and the anode layer 118 are measured (i.e., the photons absorbed in the between the gate electrode 122 and the cathode layer 116 are not measured). This allows for controlling the photon count rate of each of the pixels $114_1$-$114_M$ such that fewer electronic signals enter the readout channels $119_1$-$119_M$ of each of the pixels $114_1$-$114_M$ per unit of time.

In one instance, the above mitigates pulse pile-up, improving spectral quality. There may also be reduction in detection quantum efficiency since incident photons are discarded; however, the reduced detection quantum efficiency would not have a significant impact as the operation mode (set by the voltage at the gate electrode 122) can be switched on a pixel-by-pixel basis and/or module by module basis such that the total number of the pixels $114_1$-$114_M$ in the higher photon flux rate mode with reduced detection quantum efficiency is much smaller than the total number of the pixels $114_1$-$114_M$ operated in the lower photon flux rate mode without reduced detection quantum efficiency. In addition, the pixels $114_1$-$114_M$ in the higher photon flux rate mode may only be the pixels in the primary (unattenuated) beam where the reduced detection quantum efficiency is essentially irrelevant, or pixels in a lightly attenuated beam (e.g., photons traversing small thicknesses of an object or subject) where the signal is still strong.

Moreover, by placing the gate electrode 122 between the cathode layer 116 and the anode layer 118, a non-linear (e.g., exponential) decrease in count rate can be achieved as not only a linear decrease in photon flux rate is achieved, but the lower energy photons, which are all absorbed in the region between the gate electrode 122 and the cathode layer 116, are also ignored. As a result, to reduce a higher photon flux rate from 100 Mcps per channel to 10 Mcps per channel, the sensitive detector volume would not have to be reduced by 90% as with the configuration shown in FIG. 7. Instead, the sensitive detector volume may only need to be reduced by 40-60%. Thus, for a given photon flux rate reduction, the gate electrode 122 can be farther away from the anode layer 118, relative to the configuration of FIG. 7, making it easier to fabricate the gate electrode 122 in the direct conversion material 120 and mitigating changes in spectral performance, pulse shape, and/or distortions from scatter.

A pre-amplifier 130 and a pulse shaper 132 respectively amplify the signal and generate a pulse (e.g., a voltage or a current) indicative of the energy of a detected photon. An energy-discriminator 134 discriminates the pulse based on its peak voltage. In this example, the discriminator 134 includes a plurality of comparators that respectively compare the amplitude of the pulse with one or more thresholds that correspond to different energy levels. A comparator generates an output signal (e.g., a high or low) in response to the amplitude exceeding its threshold level. A counter 136 counts the output signals respectively for each threshold, and the count value can be fed to the pixel voltage controller 124. An energy-binner 138 bins the counts into energy ranges corresponding to ranges between the energy thresholds. The binned data is used to energy-resolve the detected photons.

It is to be appreciated that one or more of the pixel voltage controller 124, the threshold bank 128, the pre-amplifier 130, the pulse shaper 132, the energy-discriminator 134, the counter 136, and/or the energy-binner 138 can be implemented in electronics of the detector array 110 and/or electronics remote from the detector array 110.

A reconstructor 140 reconstructs the energy-binned signals using a spectral and/or a non-spectral reconstruction algorithm. A patient support 142, such as a couch, supports an object or subject in the examination region 106. A general purpose computing system serves as an operator console 142, and includes an output device such as a display and an input device such as a keyboard, mouse, and/or the like. Software resident on the console 144 allows the operator to control the operation of the system 100, for example, allowing the operator to select a spectral imaging protocol that automatically switches between lower and higher photon flux rate modes based on photon count rate, initiate scanning, etc.

FIGS. 2 and 3 schematically illustrate an example of switching between a higher photon flux rate mode and a lower photon flux rate mode. For this example, a voltage of about negative one thousand (−1000) volts is applied to the cathode layer 116 and a voltage of about zero (0) volts is applied to the anode electrodes 118.

In this example, the gate electrode 122 is located in the direct conversion material 120 such that 30% of the direct conversion material 120 of each of the pixels $114_1$-$114_M$ is between the cathode layer 116 and the gate electrode 122 and 70% of the direct conversion material 120 of each of the pixels $114_1$-$114_M$ is between the gate electrode 122 and the anode layer 118. In other embodiments, the gate electrode 122 can be closer to the cathode layer 116 or the anode layer 118, depending on the desired reduction in count rate.

In the lower photon flux rate mode (FIG. 2), a voltage of negative seven hundred (−700) volts, which represents 70% of the voltage of −1000 volts applied at the cathode layer 116, is applied at the gate electrode 122. Generally, the voltage at the gate has been set such that the electric field is homogenous. In this mode, the entire block of direct conversion material 120 between the cathode layer 116 and the anode layer 118 is sensitive to radiation as if the gate electrode 122 were absent from the direction conversion material 120, and photons are absorbed throughout the entire block of direct conversion material 120, converted to electrical signals, and conveyed via the channels $119_1$-$119_M$.

In the higher photon flux rate mode (FIG. 3), a voltage of negative one thousand (−1000) volts, which is the same as the voltage applied at the cathode layer 116, is applied at the gate electrode 122. In this mode, the sub-region of the block of direct conversion material 120 between the cathode layer 116 and the gate electrode 122 is insensitive to radiation and the sub-region of the block of direct conversion material 120 between the gate electrode 122 and the anode layer 118 is sensitive to radiation. As a consequence, only the photons absorbed between the gate electrode 122 and the anode layer 118 are converted to electrical signals, which are conveyed via the channels $119_1$-$119_M$.

As briefly discussed herein, a non-linear decrease in count rate can be achieved such that the count rate will decrease by more than the 30% percent decrease in sensitive detector volume in the higher photon flux rate mode.

In the illustrated embodiment, the same gate electrode 122 is used to control the sensitive detector volume for all of the pixels $114_1$-$114_M$ in the module 112. In another instance, the gate electrode 122 is used to control a sub-set of the pixels $114_1$-$114_M$ of a module 112. In another instance, the gate electrode 122 is used to control the pixels $114_1$-$114_M$ of multiple modules 112. In another instance, the gate electrode 122 is used to control a row and/or a column of the pixels $114_1$-$114_M$. In yet another instance, each of the pixels $114_1$-$114_M$ includes a gate electrode 122 where the voltage applied thereto is individually controlled, independent of the voltage applied to one or more other pixel gate electrodes.

Variations are contemplated.

FIG. 4 schematically illustrates a variation in which gate electrode 122 is located at a different position (50%) between the cathode layer 116 and the anode layer 118, relative to the configuration shown in FIGS. 1-3. As discussed herein, the location of the gate electrode 122 in the direct conversion material 120 determines the maximal achievable desired reduction in count rate.

FIG. 5 schematically illustrates a variation in which the direct conversion material includes a plurality of gate electrodes $502_1$ to $502_N$. In this instance, the gate electrode voltage controller 124 may compare the count rate with a plurality of corresponding flux rate thresholds (e.g., X and X+N) and switch between a plurality of photon flux rate modes, based on the results of the comparison.

FIGS. 8 and 9 shows a variation in which the gate electrode voltage is kept constant and a pixel voltage controller or other controller switches the cathode layer voltage to the gate electrode voltage to transition the detector pixel between lower photon flux rate mode to higher photon flux rate mode. Unlike the configuration of FIGS. 2 and 3, in this variation the electric field between the gate electrode 122 and the anode layer 118 does not increase.

In yet another instance, both the gate electrode voltage and the cathode layer voltage are changed. For example, for higher photon flux rates, the state of a pixel may change from that shown in FIG. 2 where the voltage of the cathode layer 116 is −1000 volts and the voltage of the anode electrode is −700 volts to a state in which the voltage of the cathode layer 116 and the voltage of the anode electrode are both −850 volts or other voltage between −1000 volts and −700 volts, including different voltages.

FIG. 6 illustrates a method in accordance with the embodiments herein and/or other embodiments.

It is to be appreciated that the ordering of the acts in the methods described herein is not limiting. As such, other orderings are contemplated herein. In addition, one or more acts may be omitted and/or one or more additional acts may be included.

At 602, an initial photon flux rate mode for direct conversion pixels of a detector array of an imaging system is selected. The initial mode can be set to a lower photon flux rate mode or a higher photon flux rate mode. This can be done automatically via selecting an imaging protocol and/or by selecting the mode At 604, an imaging procedure commences.

At 606, data is acquired.

At 608, a current photon flux rate for the pixels is determined. For example, after a predetermined (e.g., each, every other, etc.) counting period of time, a current flux rate can be computed as the quotient between the current number of total counts registered (N) to the counting period of time (T).

At 610, the current flux mode is determined.

If the current flux mode is low, then at 612, the current flux rate is compared to a higher photon flux rate threshold. If the current flux rate is equal to or less than the higher photon flux rate threshold, then act 606 is repeated. Otherwise, if the current flux rate is greater than the higher photon flux rate threshold, then at 614 the flux mode is switched to the higher flux mode, and act 606 is repeated.

If the current flux mode is high, then at 616, the current flux rate is compared to a lower photon flux rate threshold. If the current flux rate is equal to or higher than the lower photon flux rate threshold, then act 606 is repeated. Otherwise, if the current flux rate is less than the lower photon flux rate threshold, then at 616 the flux mode is switched to the lower flux mode, and act 606 is repeated.

This method allows the system 100 (e.g., the pixel voltage controller 124 and/or other component(s)) to decide when to switch from one mode to another mode. However, the mode can additionally or alternatively be manually switched by a user.

The ratio (R) between the number of counts registered in the higher flux rate mode (R2) and the number of counts registered in the lower flux rate mode (R1), for unchanged irradiation conditions, is less than one (or, $R=(R2)/(R1)<1$). Ideally, $R1*R=R2$. However, the switching implemented based on this condition could be sensitive to small fluctuations in the rate and/or to Poisson noise. As such, a hysteresis can be added so that the lower photon flux rate threshold is R2' where $R2'=H*R2$, where, for example, $0 \leq H \leq 0.8$.

In another approach, the states of all gates in the scanner are estimated prospectively for a given scan based on, for example, one or two survey scans, based on an estimate of the expected flux for each position of the gantry. This could be done on a pixel-by-pixel or module-by-module basis, where, for example, 16×32 pixels are present per module. In this instance, the photon flux rate mode switches during the scan, but in a manner determined before the scan.

The above method allows the system 100 (e.g., the pixel voltage controller 124 and/or other component(s)) to decide when to switch from one mode to another mode. However, the mode can additionally or alternatively be manually switched by a user.

The above may be implemented via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A detector array, comprising:
    at least one direct conversion detector pixel configured to detect photons of poly-chromatic ionizing radiation, the pixel, comprising:

a cathode layer;
an anode layer including an anode electrode for each of the at least one detector pixels;
a direct conversion material, disposed between the cathode layer and the anode layer;
a gate electrode disposed in the direct conversion material, parallel to and between the cathode and anode layers; and
a pixel voltage controller in electrical communication with the gate electrode, wherein the pixel voltage controller is configured to alternatively apply one of two different voltages to the gate electrode during an imaging procedure based on a photon count rate over a predetermined counting period of time.

2. The detector array of claim 1, further comprising:
a threshold bank including a higher flux rate threshold, wherein the pixel voltage controller compares the photon count rate with the higher flux rate threshold and changes the voltage applied to the gate electrode from a voltage different than a voltage of the cathode layer to a voltage approximately equal to the voltage of the cathode layer in response to the photon count rate satisfying the higher flux rate threshold.

3. The detector array of claim 2, wherein a first region of the direct conversion material between the gate electrode and the anode layer is sensitive to the photons and a second region of the direct conversion material between the gate electrode and the cathode layer is not sensitive to the photons when the voltage applied to the gate electrode is approximately equal to the voltage of the cathode layer and only photons absorbed in the first region are converted to electrical signals.

4. The detector array of claim 3, wherein a percentage of the total amount of the direct conversion material that is not sensitive to the photons is less than a percentage in a reduction in the count rate due to the second region.

5. The detector array of claim 4, wherein a reduction in an amount of the direct conversion material used to convert photons when switching the gate electrode voltage to the cathode layer voltage corresponds to a greater and non-linear reduction in the count rate.

6. The detector array of claim 4, further comprising:
a threshold bank including a higher flux rate threshold, wherein the pixel voltage controller compares the photon count rate with the higher flux rate threshold and changes the voltage applied to the cathode layer from a voltage different than a voltage of the gate electrode to a voltage approximately equal to the voltage of the gate electrode in response to the photon count rate satisfying the higher flux rate threshold.

7. The detector array of claim 6, wherein a first region of the direct conversion material between the gate electrode and the anode layer is sensitive to the photons and a second region of the direct conversion material between the gate electrode and the cathode layer is not sensitive to the photons when the voltage applied to the cathode layer is approximately equal to the voltage of the gate electrode and only photons absorbed in the first region are converted to electrical signals.

8. The detector array of claim 7, wherein a percentage of the total amount of the direct conversion material that is not sensitive to the photons is less than a percentage in a reduction in the count rate due to the second region.

9. The detector array of claim 6, wherein the threshold bank further includes a lower flux rate threshold, wherein the lower flux rate threshold is lower than the higher flux rate threshold, and the pixel voltage controller compares the photon count rate with the lower flux rate threshold and changes the voltage applied to the cathode layer from the voltage approximately equal to the voltage of the gate electrode to the voltage different than the voltage of the gate electrode in response to the photon count rate satisfying the lower flux rate threshold.

10. The detector array of claim 9, wherein a region of the direct conversion material between the cathode layer and the anode layer is sensitive to the photons such that photons absorbed in this region are converted to electrical signals.

11. The detector array of claim 6, wherein the reduction in an amount of the direct conversion material used to convert photons when switching the cathode layer voltage to the gate electrode voltage corresponds to a greater and non-linear reduction in the count rate.

12. The detector array of claim 2, wherein the threshold bank further includes a lower flux rate threshold, wherein the lower flux rate threshold is lower than the higher flux rate threshold, and the pixel voltage controller compares the photon count rate with the lower flux rate threshold and changes the voltage applied to the gate electrode from the voltage approximately equal to the voltage of the cathode layer to the voltage different than the voltage of the cathode layer in response to the photon count rate satisfying the lower flux rate threshold.

13. The detector array of claim 12, wherein a region of the direct conversion material between the cathode layer and the anode layer is sensitive to the photons such that photons absorbed in this region are converted to electrical signals.

14. The detector array of claim 1, the detector array, further comprising:
at least one detector module including a plurality of the direct conversion detector pixels, wherein a single gate electrode extends through two or more of the plurality of direct conversion detector pixels and is used to apply a same gate voltage to the two or more of the plurality of direct conversion detector pixels.

15. The detector array of claim 1, the detector array, further comprising:
at least one detector module including a plurality of the direct conversion detector pixels; and
a different gate electrode for at least two different detector pixels of the module.

16. The detector array of claim 1, the direct conversion material, comprising:
at least a second gate electrode disposed in the direct conversion material, parallel to the cathode layer and the anode layer, between the cathode layer and the anode layer, and located at a different position relative to the gate electrode.

17. A method of detecting, for higher photon flux rates, photons with a direct conversion detector having at least one detector pixel with a direct conversion material including a gate electrode and disposed between a cathode and an anode of the pixel, the method comprising:
applying a first voltage to the gate electrode, wherein the first voltage is not equal to a voltage applied to the cathode, and the first voltage causes approximately the entire direct conversion material to be used to convert photons incident on the detector pixel to corresponding signals indicative of an energy of the photons;
counting a number of photons detected in a predetermined time interval based on the signals;
determining a count rate based on the number of counted photons and the predetermined time interval;
comparing the determined count rate with a higher photon flux rate threshold; and
removing the first voltage and applying a second voltage to the gate electrode in response to the determined count rate satisfying the higher photon flux rate threshold, wherein the second voltage is approximately equal to the voltage applied to the cathode, and the second voltage causes less than the entire direct conversion material to be used to convert photons incident on the detector pixel to corresponding signals indicative of an energy of the photons.

18. The method of claim 17, wherein a reduction in an amount of the direct conversion material used to convert photons when switching from the first voltage to the second voltage corresponds to a greater and non-linear reduction in the count rate.

19. The method of claim 17,
counting a number of photons detected in the predetermined time interval with the second voltage applied to the gate electrode;
determining a count rate based on the number of counted photons and the predetermined time interval;
comparing the determined count rate with a lower photon flux rate threshold; and
removing the second voltage and applying the first voltage to the gate electrode in response to the determined count rate satisfying the lower photon flux rate threshold, and utilizing approximately the entire direct conversion material of the pixel to convert photons incident on the detector pixel to corresponding signals indicative of an energy of the photons.

20. The method of claim 17, wherein the gate electrode is not located in a same plane of the pixel as the anode.

21. A method of detecting, for higher photon flux rates, photons with a direct conversion detector having at least one detector pixel with a direct conversion material including a gate electrode and disposed between a cathode and an anode of the pixel, the method comprising:
applying a first voltage to the cathode, wherein the first voltage is not equal to a voltage applied to the gate electrode, and the first voltage causes approximately the entire direct conversion material to be used to convert photons incident on the detector pixel to corresponding signals indicative of an energy of the photons.
counting a number of photons detected in a predetermined time interval based on the signals;
determining a count rate based on the number of counted photons and the predetermined time interval;
comparing the determined count rate with a higher photon flux rate threshold; and
removing the first voltage and applying a second voltage to the cathode in response to the determined count rate satisfying the higher photon flux rate threshold, wherein the second voltage is approximately equal to the voltage applied to the gate electrode, and the second voltage causes less than the entire direct conversion material to be used to convert photons incident on the detector pixel to corresponding signals indicative of an energy of the photons.

22. The method of claim 21, wherein a reduction in an amount of the direct conversion material used to convert photons when switching from the first voltage to the second voltage corresponds to a greater and non-linear reduction in the count rate.

23. The method of claim 21,
counting a number of photons detected in the predetermined time interval with the second voltage applied to the gate electrode;
determining a count rate based on the number of counted photons and the predetermined time interval;
comparing the determined count rate with a lower photon flux rate threshold; and
removing the second voltage and applying the first voltage to the cathode in response to the determined count rate satisfying the lower photon flux rate threshold, and utilizing approximately the entire direct conversion material of the pixel to convert photons incident on the detector pixel to corresponding signals indicative of an energy of the photons.

24. The method of claim 21, wherein the gate electrode is not located in a same plane of the pixel as the anode.

25. An imaging system, comprising:
a radiation source configured to emit ionizing radiation; and
a detector array including at least one direct conversion detector pixel configured to detect the ionizing radiation, the pixel, comprising:
a cathode layer;
an anode layer including an anode electrode for each of the detector pixels;
a direct conversion material, disposed between the cathode layer and the anode electrode, which converts photons of the ionizing radiation that are absorbed in the direct conversion material into electrical signals indicative of an energy of the absorbed photons; and
a gate electrode disposed in the direct conversion material, parallel to the cathode layer and the anode layer, between the cathode layer and the anode layer; and
a cathode layer voltage controller in electrical communication with the cathode layer, wherein the cathode layer voltage controller is configured to alternatively apply one of two different voltages to the cathode layer during an imaging scan based on a detected photon flux rate, which switches at least one of the pixels between lower photon flux rate mode and higher photon flux rate mode.

26. The imaging system of claim 25, further comprising:
a pixel voltage controller in electrical communication with the gate electrode, wherein the pixel voltage controller is configured to alternatively apply the one of two different voltages to the gate electrode during the imaging scan based on the detected photon flux rate, which switches the at least one of the pixels between the lower photon flux rate mode and the higher photon flux rate mode.

27. The imaging system of claim 25, wherein a reduction in an amount of the direct conversion material used to convert photons when switching from a first voltage to a second voltage corresponds to a greater and non-linear reduction in the count rate.

* * * * *